United States Patent
Ikai et al.

(10) Patent No.: US 9,694,456 B2
(45) Date of Patent: Jul. 4, 2017

(54) MOTOR CONTROL SYSTEM PROVIDED WITH FUNCTION TO DETECT ABNORMAL BRAKING AND METHOD OF DETECTING ABNORMAL BRAKING

(71) Applicant: FANUC CORPORATION, Yamanashi (JP)

(72) Inventors: Satoshi Ikai, Yamanashi (JP); Tomoyuki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/084,991

(22) Filed: Mar. 30, 2016

(65) Prior Publication Data
US 2016/0346885 A1    Dec. 1, 2016

(30) Foreign Application Priority Data

May 29, 2015    (JP) ................................ 2015-110114

(51) Int. Cl.
| | |
|---|---|
| *G05B 19/18* | (2006.01) |
| *B23Q 5/52* | (2006.01) |
| *H02P 3/26* | (2006.01) |
| *B23Q 5/32* | (2006.01) |

(52) U.S. Cl.
CPC .............. *B23Q 5/52* (2013.01); *B23Q 5/326* (2013.01); *G05B 19/182* (2013.01); *H02P 3/26* (2013.01); *G05B 2219/34429* (2013.01); *G05B 2219/41279* (2013.01); *G05B 2219/45145* (2013.01)

(58) Field of Classification Search
CPC ................................ H02P 3/26; G05B 19/182
USPC ........................................ 318/565, 563, 560
See application file for complete search history.

(56) References Cited

U.S. PATENT DOCUMENTS 5,994,864 A * 11/1999 Inoue ..................... B25J 9/1633
                                                    318/568.2

FOREIGN PATENT DOCUMENTS

| JP | 1295793 A | 11/1989 |
|---|---|---|
| JP | 6284766 A | 10/1994 |
| JP | 739190 A | 2/1995 |
| JP | 3081258 B2 | 8/2000 |
| JP | 2012213844 A | 11/2012 |

OTHER PUBLICATIONS

English Abstract and Machine Translation for Japanese Publication No. 07-039190 A, published Feb. 7, 1995, 6 pgs.
(Continued)

*Primary Examiner* — David S Luo
(74) *Attorney, Agent, or Firm* — Fredrikson & Byron, P.A.

(57) ABSTRACT

The motor control system of the present invention includes a signal receiving unit for receiving a signal for operating a mechanical brake, a position monitoring unit for obtaining the history of the rotational position of the servo motor from the receipt of the signal to when the rotation of the servo motor stops using a position detector, a displacement amount calculation unit which calculates the rotational displacement of the servo motor from the receipt of the signal to when the rotation of the servo motor stops from the history, and an abnormality determining unit which determines that an abnormality exists in the mechanical brake when the calculated rotational displacement exceeds a predetermined first threshold value.

6 Claims, 3 Drawing Sheets

(56) References Cited

OTHER PUBLICATIONS

English Abstract and Machine Translation for Japanese Publication No. 2012-213844 A, published Nov. 8, 2012, 21 pgs.
English Abstract and Machine Translation for Japanese Publication No. 01-295793 A, published Nov. 29, 1989, 5 pgs.
English Abstract and Machine Translation for Japanese Publication No. 06-284756 A, published Oct. 7, 1994, 11 pgs.
English Abstract and Machine Translation for Japanese Publication No. 3081258 B2, published Aug. 28, 2000, 9 pgs.
Untranslated Decision to Grant a Patent mailed by Japan Patent Office (JPO) for Application No. JP 2015-110114 Dec. 20, 2016 3 pages.
English machine translation of Decision to Grant a Patent mailed by Japan Patent Office (JPO) for Application No. JP 2015-110114 Dec. 20, 2016 3 pages.
Untranslated Notification of Reasons for Refusal mailed by Japan Patent Office (JPO) for Application No. JP 2015-110114, Jul. 19, 2016, 3 pages.
English machine translation of Notification of Reasons for Refusal mailed by Japan Patent Office (JPO) for Application No. JP 2015-110114, Jul. 19, 2016, 3 pages.

\* cited by examiner

MOTOR CONTROL SYSTEM PROVIDED WITH FUNCTION TO DETECT ABNORMAL BRAKING AND METHOD OF DETECTING ABNORMAL BRAKING

BACKGROUND OF THE INVENTION

1. Field of Invention

The present invention relates to a motor control system provided with a mechanical brake which brakes an output axis of a servo motor once the energization of the servo motor is released, and especially relates to a motor control system provided with a function of detecting abnormalities in such a mechanical brake and a method of detecting abnormalities of a mechanical brake.

2. Related Art

A machine tool which moves a main spindle head along a ball screw by rotating the ball screw by a servo motor is conventionally known. A tool such as an end mill or drill is attached to the main spindle head, and machining of a workpiece is carried out by moving the main spindle head towards the workpiece while rotating the tool.

Further, there is a machine tool, such as a vertical milling machine, wherein a ball screw extends in the direction of gravity, so that the main spindle head is moved up and down in the direction of gravity. In such a machine tool, if the excitation of the servo motor is released when the power is off or during an emergency stoppage, the ball screw can rotate freely and there is a risk that the main spindle head will fall due to the effects of gravity. Therefore, in a machine tool where the main spindle head moves up and down, a mechanical brake for braking the output axis of the servo motor when the power is off or during an emergency stoppage, is attached.

Further, in an industrial robot, as a servo motor is used to drive an axis of the robot, there is also a risk that the arm of the robot will fall when the energization of the servo motor is released when the power is off or during an emergency stoppage. Therefore, in industrial robots a mechanical brake for braking the output axis of the servo motor is mounted.

Further if an abnormality exists in the aforementioned mechanical brake, when the power is off or during an emergency stoppage, the main spindle head of the machine tool or the robot arm may fall. Accordingly, as illustrated in Japanese Patent No. 3081258 or Japanese Patent laid-open No. H06-284766, a method for detecting abnormalities in the aforementioned mechanical brake has been proposed.

Japanese Patent No. 3081258 discloses a mechanical brake comprising a brake disc connected to an output axis of a motor, and a brake shoe pressed against the brake disc. Further, in a method of detecting a failure of the mechanical brake disclosed in Japanese Patent No. 3081258, when braking a rotation axis of the motor, the current value at the start of the motor rotating is detected while the current supplied to the motor is gradually increased. Similarly, when not braking the rotation axis of the motor, the current value at the start of the motor rotating is detected while the current supplied to the motor is gradually increased. Further, by comparing the difference between the detected currents and a set value corresponding to the brake torque, a failure of the mechanical brake is detected.

Moreover, in the method of detecting an abnormality in a mechanical brake disclosed in Japanese Patent laid-open No. H06-284766, when the amount of wear of a friction braking member of a mechanical brake is within a normal range, the motor is driven without operating the mechanical brake and the motor load current value at the time the motor is driven is measured and stored beforehand. When the mechanical brake is inspected, as when the amount of wear of the friction braking member is within a normal range, the motor is driven without operating the mechanical brake, and the size of the motor load current while the motor is driven is detected. Further, an abnormality of the mechanical brake is detected by comparing the detected motor load current value with the previously stored motor load current value.

The mechanical brake abnormality detection methods disclosed in the aforementioned Japanese Patent No. 3081258 and Japanese Patent laid-open No. H06-284766 are methods in which the diagnosis of the existence of an abnormality of the mechanical brake is carried out by separately executing a mechanical brake inspection program. Accordingly, in the abnormality detection method for a mechanical brake disclosed in Japanese Patent No. 3081258 and Japanese Patent laid-open No. H06-284766, there is the problem that there are cases when an abnormality has occurred in the mechanical brake before the inspection of the mechanical brake is carried out. Therefore, it is desirable to have a method of detecting an abnormality of a mechanical brake or indications thereof even when an inspection of the mechanical brake is not carried out.

SUMMARY OF THE INVENTION

The present invention provides a brake abnormality detection method and a motor control system which can detect, at an early stage, an abnormality of a mechanical brake which brakes a servo motor or a axis driven thereby.

According to the first aspect of the present invention, there is provided a motor control system comprising a servo motor, a mechanical brake acting on the servo motor or an axis driven by the servo motor, a controller which controls the servo motor and the mechanical brake, a position detector which detects the rotation position of the servo motor or the position of the axis, wherein the controller comprises a signal receiving unit which receives a signal which operates the mechanical brake, a position monitoring unit which monitors the rotation position of the servo motor by the position detector, and obtains the history of the rotation positions of the servo motor from when the signal is received to when the servo motor stops rotating, a displacement amount calculation unit which calculates, from the history, the amount of rotational displacement of the servo motor from when the signal is received to when the servo motor stops rotating, and an abnormality determining unit which determines that an abnormality exists in the mechanical brake when the calculated amount of rotational displacement exceeds a predetermined first threshold value.

According to the second aspect of the present invention, there is provided the motor control system according to the first aspect wherein the position monitoring unit obtains the rotation speed of the servo motor when the signal is received, the abnormality determining unit changes the first threshold value in accordance with the obtained rotation speed and determines that an abnormality exists in the mechanical brake if the amount of rotational displacement calculated by the displacement amount calculation unit is higher than the threshold value after the change.

According to the third aspect of the present invention, there is provided the motor control system according to the first aspect wherein the position monitoring unit obtains the rotational speed of the servo motor when the signal is received, the displacement amount calculation unit divides the square of the obtained rotational speed by the previously calculated amount of rotational displacement, and the abnormality determining unit determines that an abnormality exists in the mechanical brake when the quotient is smaller than a second predetermined threshold value.

According to the fourth aspect of the present invention, there is provided the motor control system according to the first or second aspect wherein the controller further comprises a first storage unit which sequentially stores the amount of rotational displacement calculated by the displacement amount calculation unit every time a signal is received, wherein, the abnormality determining unit determines that an abnormality exists in the mechanical brake when the amount of rotational displacement calculated by the displacement amount calculation unit every time a signal is received, increases more than the amount of rotational displacement previously stored in the first storage unit.

According to the fifth aspect of the present invention, there is provided the motor control system according to the third aspect, wherein the controller further comprises a first storage unit which sequentially stores the quotient obtained from the displacement amount calculation unit every time a signal is received, wherein, the abnormality determining unit determines that an abnormality exists in the mechanical brake when the quotient obtained from the displacement amount calculation unit every time a signal is received, decreases more than the quotient previously stored in the first storage unit.

According to the sixth aspect of the present invention, there is provided the motor control system according to any one of the first to fifth aspects, wherein, the controller further comprises a second storage unit for storing the history of the rotation positions of the servo motor obtained by the position monitoring unit, wherein the history stored in the second storage unit is output to the outside of the controller.

According to the seventh aspect of the present invention, there is provided a brake abnormality detection method for a motor control system comprising, a servo motor, a mechanical brake acting on the servo motor or an axis driven by the servo motor, a position detector which detects the rotation position of the servo motor or the position of the axis, wherein the brake abnormality detection method comprises the steps of: obtaining the history of the rotation positions of the servo motor from the start of the operation of the mechanical brake until the rotation of the servo motor stops; calculating, from the aforementioned history, the amount of rotational displacement of the servo motor from the start of the operation of the mechanical brake until the rotation of the servo motor stops; and determining that an abnormality exists in the mechanical brake when the calculated amount of rotational displacement exceeds a first threshold value.

According to the eighth aspect of the present invention, there is provided the brake abnormality detection method of the seventh aspect, further comprising: obtaining the rotation speed of the servo motor when the operation of the mechanical brake is started; changing the first threshold value in accordance with the rotation speed thus obtained; and judging that an abnormality exists in the mechanical brake, when the calculated amount of rotational displacement exceeds the first threshold value after the change.

According to the ninth aspect of the present invention, there is provided the brake abnormality detection method of the seventh aspect, further comprising: obtaining the rotation speed of the servo motor at the start of the operation of the mechanical brake; dividing the square of the obtained rotation speed by the previously calculated amount of rotational displacement; and judging that an abnormality exists in the mechanical brake when the quotient is lower than a predetermined second threshold value.

According to the tenth aspect of the present invention, there is provided the brake abnormality detection method of the seventh or eighth aspect, further comprising: judging that an abnormality exists in the mechanical brake when the calculated amount of rotational displacement increases every time the mechanical brake is operated.

According to the eleventh aspect of the present invention, there is provided the brake abnormality detection method of the ninth aspect, further comprising: judging that an abnormality exists in the mechanical brake when the quotient decreases every time the mechanical brake is operated.

According to the twelfth aspect of the present invention, there is provided the brake abnormality detection method of any of the seventh to eleventh aspect, further comprising: outputting the rotation position history of the servo motor from the start of operating the mechanical brake until the rotation of the servo motor stops, to the outside.

BRIEF DESCRIPTION OF THE DRAWINGS

The above mentioned objects, features, and advantages and other objects, features and advantages of the present invention will become more apparent from the following detailed description of the exemplary embodiments of the present invention illustrated in the accompanying drawings in which.

DETAILED DESCRIPTION

Figure 1:
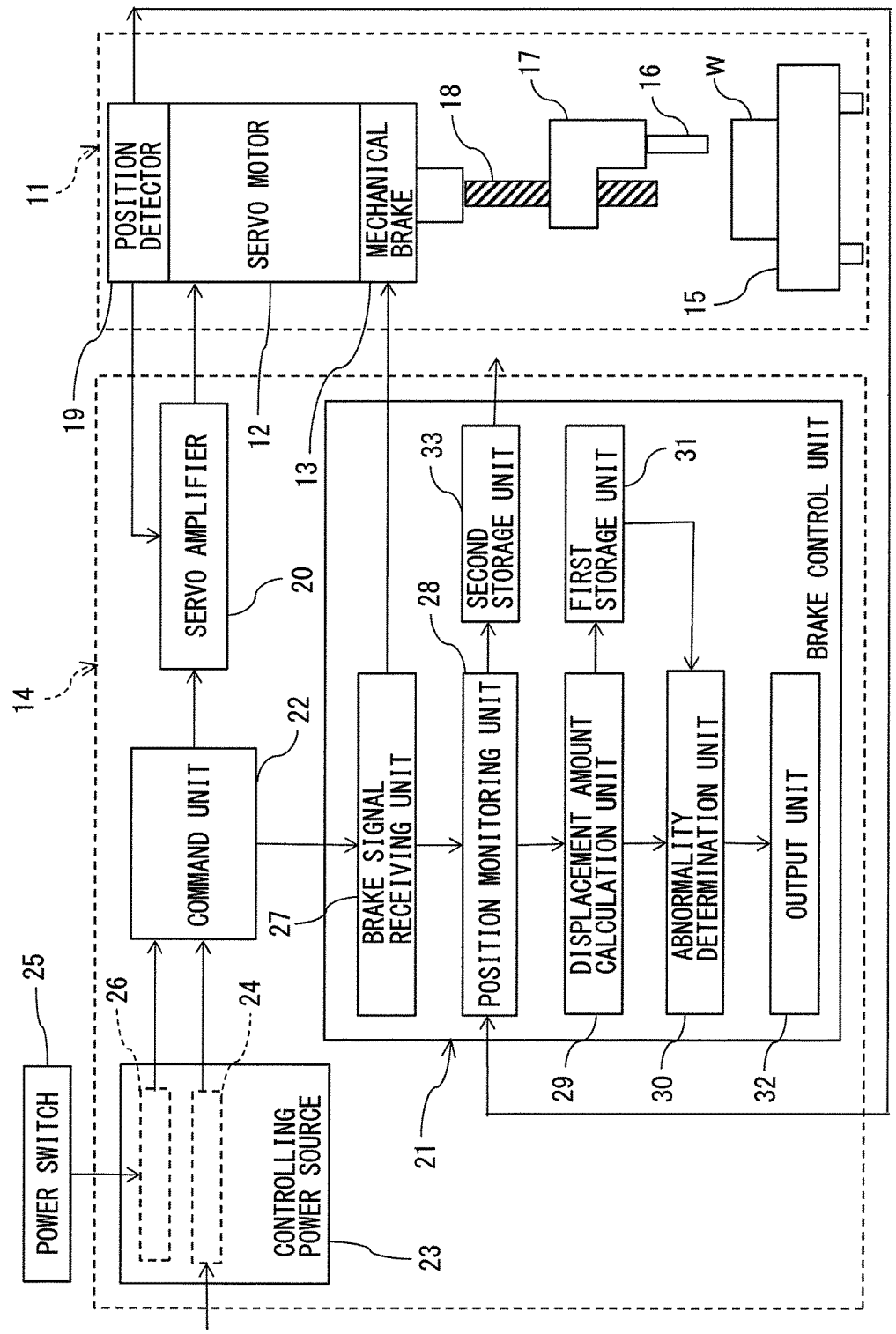
FIG. 1 is a block diagram illustrating the configuration of the motor control system of the first embodiment.

Hereinafter, embodiments of the present invention will be described referring to the drawings. The same reference numerals for the same or corresponding constitutional elements are used in the drawings. The scale of the drawings showing the constitutional elements of the illustrated embodiments has appropriately been adjusted so as to facilitate the understanding of the present inventions. Further, the following explanation of the motor control system is exemplified by the application thereof to a machine tool. However, the present inventions are not limited thereto.

First Embodiment

FIG. 1 is a block diagram illustrating the configuration of the motor control system of the first embodiment. The motor control system of the first embodiment, as shown in FIG. 1, comprises a servo motor 12 built into a machine tool 11, a mechanical brake 13 which acts on a servo motor or an axis driven by a servo motor, and a controller 14 which controls the servo motor 12 and the mechanical brake 13.

The machine tool 11 is, for example, a vertical machining center or a vertical milling machine. The machine tool 11 comprises a work table 15 on which a workpiece W to be machined is mounted and a main spindle head 17 which is provided above the work table 15, and to which a tool 16 attached to machine the workpiece W mounted on the work table 15. The main spindle head 17 is movable along the ball screw 18 extending in the direction of gravity. The ball screw 18 is connected to the output axis of the servo motor 12.

The machine tool 11 comprises a position detector 19, for example an encoder, which detects the position (rotation position) of the output axis of the servo motor 12. The controller 14 comprises a servo amplifier 20 which is connected to and controls the servo motor 12 of the machine tool 11 and a brake control unit 21 which is connected to and controls the mechanical brake 13.

A command unit 22 is connected to the servo amplifier 20 and the brake control unit 21. The command unit 22 provides command values such as the rotational speed or the rotation position of the servo motor 12 to the servo amplifier 20. Further, the servo amplifier 20 feedback controls the servo motor 12 based on the command value of the command unit 22 and the output value of the position detector 19.

Furthermore, the command unit 22, outputs a power cut-off signal to the servo amplifier 20 when the power off signal, which will be described later, is input, and outputs a brake signal to the brake control unit 21. The servo amplifier 20 stops the supply of electricity to the servo motor 12 in response to the power cut-off signal, and the brake control unit 21 operates the mechanical brake 13 by the brake signal.

In the present embodiment, the main spindle head 17 of the machine tool 11 moves up and down in the direction of gravity along the ball screw 18. Accordingly, by operating the mechanical brake 13 when the supply of electricity is stopped to the servo motor 12 which drives the ball screw 18, the fall of the main spindle head 17 due to the influence of gravity can be prevented.

An example of the mechanical brake 13 will be described. The mechanical brake 13 comprises, for example, a friction braking member (not illustrated) driven by a solenoid (not illustrated), and an elastic member (not illustrated) which biases the friction braking member against the output axis of the servo motor 12 or a member coupled thereto. Further, by supplying electricity to the solenoid, the friction braking member separates from the output axis of the servo motor 12 against the biasing force of the elastic member. Namely, the mechanical brake 13 is released. On the other hand, by stopping the supply of electricity to the solenoid according to the brake signal described above, the friction braking member is pressed against the output axis of the servo motor 12 by the elastic member. Namely, the friction braking member secures the output axis of the servo motor 12. The mechanical brake 13 in the illustrated embodiment acts on the output axis of the servo motor 12 by way of example but the present invention is not limited thereto. Namely, the mechanical brake 13 may act on an axis driven by the servo motor 12.

Further, as illustrated in FIG. 1, the controller 14 comprises a controller power supply source 23. The controller power supply source 23 is connected to the command unit 22. The controller power supply source 23 comprises a power outage detection circuit 24 to which a power off signal is inputted when a power outage occurs, a power off detection circuit 26 to which a power off signal is inputted when a power switch 25, which is provided on the outside of the controller 14, is switched from on to off. The power switch 25 is switched on while the machine tool 11 is in operation, and is switched off after the operation by the machine tool 11 has been finished or upon an emergency stoppage of the machine tool 11. Further, aside from the power switch 25, for example, a sensor which can detect the intrusion of a person into the machine tool 11 may be provided. The detection signal of the sensor may be input to the power off detection circuit 26 as a power off signal.

When the power switch 25 is off, namely, while the power is off, the power off detection circuit 26 detects a power off signal and outputs a signal to the command unit 22. Further, during a power outage, the power outage detection circuit 24 detects the power off signal and outputs a signal to the command unit 22.

The command unit 22 outputs a power cut-off signal to the servo amplifier 20 and outputs a brake signal to the brake control unit 21 in accordance with the power off signal from the power outage detection circuit 24 or the power off detection circuit 26 for the controller power supply source 23. Furthermore, the command unit 22 may output a signal detecting an abnormality with the operating program of the machine tool 11 as a brake signal to the brake control unit 21.

When the servo amplifier 20 receives a power cut-off signal from the command unit 22, the supply of electricity to the servo motor 12 of the machine tool 11 is stopped, resulting in the servo motor 12 being in a de-energized state. On the other hand, if the brake control unit 21 receives a brake command from the command unit 22, the mechanical brake 13 of the machine tool 11 is operated. Accordingly, the main spindle head 17 is braked. Specifically, in the machine tool 11 which moves the main spindle head up and down, the position thereof can be maintained by the mechanical brake 13 while the power is off or during power outages.

Furthermore, in the present application, the brake control unit 21 determines whether or not an abnormality exists in the mechanical brake 13.

An "abnormality in the mechanical brake" as used herein means a state in which the intended braking force cannot be obtained for reasons such as: oil has adhered to the surface of the friction braking member of the mechanical brake 13, the surface of the friction braking member has changed such that the braking force is reduced, the elastic member which biases the friction braking member has been damaged or the friction braking member has become remarkably worn.

More specifically, the brake control unit 21, as illustrated in FIG. 1, has a brake signal receiving unit 27, a position monitoring unit 28, a displacement amount calculation unit 29, an abnormality determining unit 30, an output unit 32, a first storage unit 31 and a second storage unit 33. The abnormality detection procedure for the mechanical brake 13, including the operation of the aforementioned units will be discussed below.

Figure 2:
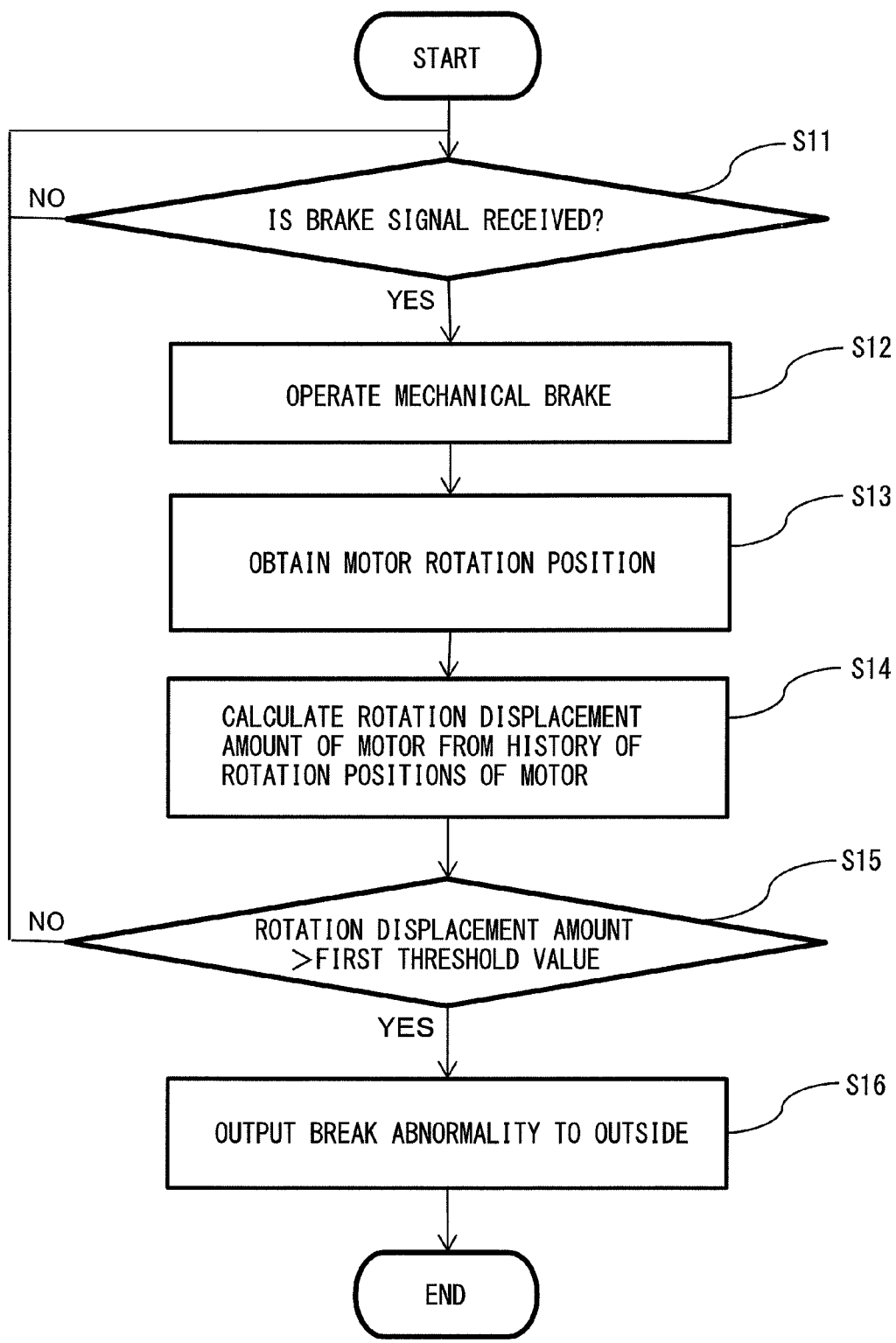
FIG. 2 is a flowchart illustrating the procedure for detecting an abnormality of the mechanical brake illustrated in FIG. 1.

FIG. 2 is a flowchart illustrating the procedure for detecting an abnormality of the mechanical brake 13 illustrated in FIG. 1.

With reference to both FIGS. 1 and 2, first, when the brake signal receiving unit 27 of the brake control unit 21 receives a brake signal from the command unit 22 (FIG. 2, step S11), the mechanical brake 13 is operated (FIG. 2 step S12). At this time, a power cut-off signal is sent from the command unit 22 to the servo amplifier 20 which stops the supply of electricity to the servo motor 12 (so-called servo-off).

Further, the brake signal receiving unit 27 outputs the brake signal from the command unit 22 to the position monitoring unit 28, at the same time as the operation of the mechanical brake 13.

Thereafter, the position monitoring unit 28 of the brake control unit 21 monitors the position (rotation position) of the output axis of the servo motor by the position detector 19, for example, an encoder. Specifically, the position monitoring unit 28 starts the detection of the rotation position of the servo motor 12 with the aforementioned brake signal as a trigger signal, and obtains a history of the rotation positions of the servo motor 12 from the start of detection to when the rotation of the servo motor stops (FIG. 2, step S13).

Thereafter, the displacement amount calculation unit 29 of the brake control unit 21, from the history of the rotation positions of the servo motor 12 obtained by the position monitoring unit 28, calculates the rotational displacement amount of the servo motor 12 (FIG. 2, step S14). The rotational displacement amount calculated in step S14 is the amount the position of the output axis of the servo motor 12 has changed in the rotation direction, from the start of braking the output axis of the servo motor 12 to when the rotation of the servo motor 12 has stopped. The calculated rotational displacement amount corresponds to a falling amount of the main spindle head 17 after an operation of the mechanical brake 13. Accordingly, it is determined that the larger the rotational displacement amount calculated by the displacement amount calculation unit 29, the lower the braking force of the mechanical brake 13. Accordingly, the abnormality determining unit 30 of the brake control unit 21 determines that when the rotational displacement amount calculated by the displacement amount calculation unit 29 exceeds a predetermined first threshold value, an abnormality exists in the mechanical brake 13 (FIG. 2, step S15). The predetermined first threshold value can be changed and is stored beforehand in the first storage unit 31.

Further, the output unit 32 of the brake control unit 21 outputs to the outside of the controller 14 that an abnormality exists in the mechanical brake (FIG. 2, step S16). As a method for output, displaying on a screen, printing, a light or sound alarm can be considered.

Figure 3:
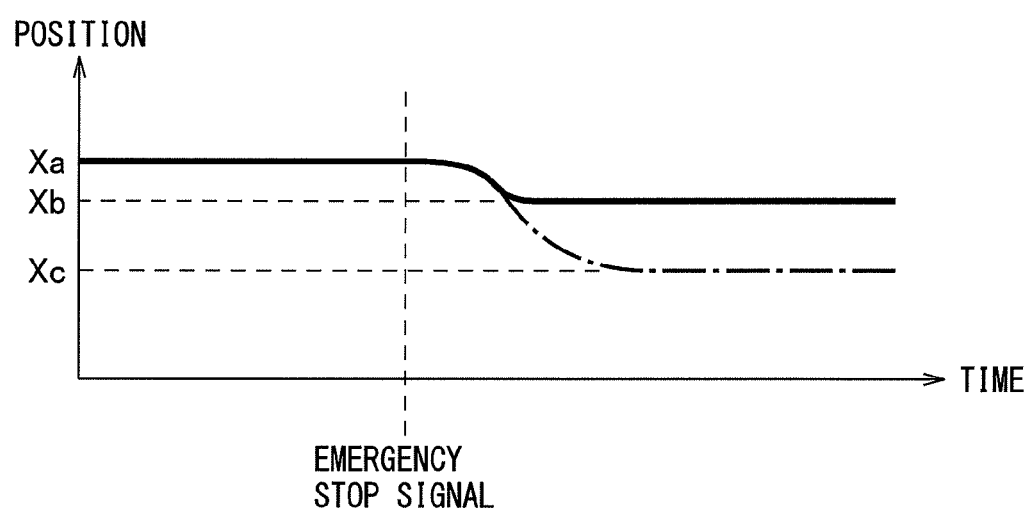
FIG. 3 is a graph illustrating the amount the main spindle head falls after the input of an emergency stop signal in the motor control system illustrated in FIG. 1.

FIG. 3 is a graph illustrating the amount the main spindle head 17 falls after the mechanical brake 13 has been operated (for example, after the input of an emergency stop signal). In the graph, the horizontal axis represents time and the vertical axis represents the position of the main spindle head 17. Further, the solid line in the graph represents the change in position of the main spindle head 17 when the mechanical brake 13 is operating normally. Furthermore, the long and short dash line represents the change in position of the main spindle head 17 when an abnormality exists in the mechanical brake 13.

For example, when the controller 14 of the mechanical tool 11 receives an emergency stop signal inputted thereto, the supply of power to the servo motor 12 is stopped, and the mechanical brake 13 is operated and the main spindle head 17 is braked. When the mechanical brake 13 is operating normally, as illustrated with the solid line in FIG. 3, the position Xb of the main spindle head 17, when the servo motor 12 stops rotating in response to the emergency stop signal, has only slightly dropped from position Xa when the emergency stop signal was inputted. The reason a small drop occurs even during the normal operation of the mechanical brake 13 is that in a mechanical brake 13 using a friction braking system, due to assembly accuracy or backlash of a gear, there is a period braking does not occur.

However, if an abnormality of the mechanical brake 13 occurs, the period described above increases from when the braking by the mechanical brake 13 starts, to when the rotation of the servo motor stops. Therefore, when an abnormality exists in the mechanical brake 13, as illustrated by the long and short dash line in FIG. 3, the position Xc of the main spindle head 17 when the servo motor 12 stops rotating in response to the emergency stop signal, corresponds to a position which has fallen more from the position Xa at the input of the emergency stop signal than the position Xb when the brake is operating normally.

From the above, the controller 14 of the present invention obtains the position displacement of the main spindle head 17 from when the emergency stop signal is inputted to when the rotation of the servo motor 12 stops as illustrated in FIG. 3, by the position monitoring unit 28 illustrated in FIG. 1. Further, the displacement amount calculation unit 29 and the abnormality determining unit 30 that are illustrated in FIG. 1 calculate the falling amount (displacement amount) of the main spindle head 17 from when the emergency stop signal is inputted, and determine whether or not an abnormality exists in the mechanical brake 13 based on the calculated displacement, respectively. Namely, according to the present invention, the degree to which the drop in effectiveness of the mechanical brake 13, when finishing a job with the mechanical tool 11 or at an emergency stoppage of the mechanical tool 11 can be understood. Accordingly, an abnormality of the mechanical brake 13 or indications thereof can be detected, without separately carrying out an inspection of the mechanical brake 13.

In the aforementioned first embodiment, the first storage unit 31 illustrated in FIG. 1 may be provided with a function of sequentially storing the rotational displacement amount calculated by the displacement amount calculation unit 29, every time a brake signal is received, namely every time the mechanical brake 13 is operated. In the case such a function is provided, the abnormality determining unit 30 can compare the rotational displacement amount calculated by the displacement amount calculation unit 29 and the rotational displacement amount previously stored in the first storage unit 31, every time a brake signal is received. Further, every time a brake signal is received, when the rotational displacement amount calculated by the displacement amount calculation unit 29 increases, it is preferable that the abnormality determining unit 30, determines this as a sign of the reduction in effectiveness of the mechanical brake 13.

Furthermore, in the motor control system of the first embodiment, the brake control unit 21 may further comprise a second storage unit 33 as illustrated in FIG. 1. The second storage unit 33 stores the history of the rotation positions of the servo motor 12 obtained by the position monitoring unit 28, and the stored history of the rotational positions are preferably output to the outside of the controller 14. In this way, when the second storage unit 33 is provided, a graph can be created as illustrated in FIG. 3 and as such, the rotational displacement amount of the servo motor 12 from when a brake signal is received to when the rotation of the servo motor stops 12 can be understood visually. Furthermore, the rotational displacement of the servo motor 12 from when a brake signal is received to when the rotation of the servo motor 12 stops can be output, and therefore a user of the machine tool 11 can easily notify a third person about the current state of the mechanical brake 13.

Second Embodiment

Next, the second embodiment will be described. The same reference numerals shall be used for the same constitutional elements as the first embodiment and an explanation therefor will be omitted. Accordingly, the constitutional elements of the first embodiment will only be described with respect to any differences thereto.

In the aforementioned first embodiment, if the rotational displacement amount of the servo motor 12 from when the mechanical brake 13 is operated to when the rotation of the servo motor 12 stops, that is, if the falling amount of the main spindle head 17 exceeds the predetermined first threshold value, the abnormality determining unit 30 determines that an abnormality exists. When the rotation of the servo motor 12 is suddenly stopped by the input of an emergency stop signal, the rotation speed of the servo motor 12 differs depending on the command speed that is issued by the command unit 22. The faster the rotation speed (initial rate) of the servo motor 12 at this time, the longer the time required from the start of braking of the mechanical brake 13, the mechanical brake being a friction braking system, to the stopping of the rotation of the servo motor 12. As a result, even if the mechanical brake is operating normally, the falling amount (rotational displacement amount) of the main spindle head 17 from when the emergency stop signal is input will differ depending on the rotation speed of the servo motor 12 when the emergency stop signal is inputted. The configuration of the second embodiment is illustrated taking this point into consideration.

Namely, the motor control system according to the second embodiment is the motor control system of the first embodiment illustrated in FIG. 1 further comprising a speed detector (not illustrated) which detects the rotation speed of the servo motor 12. Further, in the second embodiment, the abnormality determining unit 30 can change the first threshold value, which determines an abnormality of the mechanical brake 13, according to the rotation speed of the servo motor 12 when a brake signal accompanying a power off signal, emergency stop signal, or an alarm etc. is received.

More specifically, with reference to FIG. 1, when the brake signal receiving unit 27 receives a braking signal, the position monitoring unit 28 obtains the rotation speed of the servo motor using the speed detector (not illustrated). The obtained rotation speed is sent to the abnormality determining unit 30. Further, the abnormality determining unit 30 changes the first threshold value stored in the first storage unit 31 according to the detected rotational speed. Furthermore, the abnormality determining unit 30 compares the threshold value after the change and the rotational displacement amount calculated by the displacement amount calculation unit 29. If the rotational displacement is larger than the threshold value after the change, it is determined that an abnormality exists in the mechanical brake 13.

Furthermore, as described above, when the first threshold value is changed, the first threshold value is changed, for example, by changing the coefficient by which the first threshold value is multiplied according to a rank which is applied to a detected rotational speed. Specifically, with respect to a higher rotational speed, a larger coefficient is set. Accordingly, the higher the detected rotational speed, the larger the threshold value after the change.

As described above, by changing the first threshold value which determines the abnormality of the mechanical brake 13, according to the rotation speed of the servo motor 12 when the brake signal is received, the abnormality of the mechanical brake 13 or indication thereof can be detected more accurately than in the motor control system according to the first embodiment.

The position detector 19 illustrated in FIG. 1, by using a pulse coder such as an encoder, can not only detect the rotation position of the servo motor 12 but also the rotational speed thereof. Accordingly, it is not necessary to provide the aforementioned speed detector separately in the motor control system.

Further, the rotational speed of the servo motor 12 may be obtained using the following method. For example, using the position detector 19 illustrated in FIG. 1, the rotational displacement amount of the servo motor 12, from the reception of the brake signal to the passage of a small amount of time, is obtained. Further, by differentiating the rotational displacement, the rotational speed of the servo motor 12 can be obtained.

Third Embodiment

Next, the third embodiment will be described. The same reference numerals are used for the same constitutional elements as the first and second embodiments and an explanation therefor will be omitted. Accordingly, the constitutional elements of the first embodiment will only be described with respect to any differences thereto.

In the aforementioned second embodiment, the first threshold value which determines an abnormality in the mechanical brake 13 is changed according to the rotation speed of the servo motor 12 when the brake signal is received. However, in the second embodiment, the degree by which the first threshold value is changed, for example, the choice of coefficients by which the first threshold value is multiplied, is greatly reliant on the experience of the developer of the motor control system. A configuration in which the threshold value can be set by strictly considering the rotational speed of the servo motor 12 when a brake signal is received when detecting an abnormality of the mechanical brake 13 according to the third embodiment will be described.

The third embodiment of the motor control system is the motor control system of the first embodiment as illustrated in FIG. 1 further comprising a speed detector for detecting the rotational speed of the servo motor 12. In such a configuration:

V is the rotational speed (initial speed) of the servo motor when a brake signal is received;

t is the time taken from when the brake signal is received to when the rotation of the servo motor 12 stops;

L is the falling amount of the main spindle head 17 from when the brake signal is received to when the rotation of the servo motor 12 stops (i.e., the rotational displacement amount of the servo motor 12); and a is the degree of deceleration which occurs on operating the mechanical brake 13.

Herein $t=V/a$ is obtained from $V-at=0$.

Further, $L=1/(2a) \times V^2$ is obtained from $1/2at^2$. Thus, the falling amount L is proportional to the square of the initial speed V.

Accordingly, deceleration a is represented by $a=1/2 \times V^2/L$ from $L=1/(2a) \times V^2$. Namely, deceleration a is proportional to the quotient of the square of the initial speed V divided by the falling amount L. Thus, as the value ($V^2/L$) decreases, deceleration a becomes smaller and the effective force of the mechanical brake 13 decreases.

As may be understood from the foregoing, the motor control system of the third embodiment detects abnormalities or indications thereof as will be described. Namely, with reference to FIG. 1, when the brake signal receiving unit 27 receives a brake signal, the position monitoring unit 28 obtains the rotational speed (initial rate V) of the servo motor 12 using the speed detector (not illustrated). The obtained rotation speed (initial rate V) is sent to the displacement amount calculation unit 29.

Further, the displacement amount calculation unit 29 calculates the rotational displacement amount (falling amount L) of the servo motor 12 from when the brake signal is received to when the rotation of the servo motor 12 stops. Furthermore, the displacement amount calculation unit 29 obtains the quotient of ($V^2/L$) obtained by dividing the square of the rotational speed (initial rate V) obtained by the position monitoring unit 28 by the previously calculated rotational displacement amount (falling amount L). Further, the abnormality determining unit 30 determines the existence of an abnormality in the mechanical brake 13 when the quotient of ($V^2/L$) is smaller than the second threshold value stored in the first storage unit 31.

In the present embodiment, when detecting an abnormality of the mechanical brake 13, the second threshold value can be set while strictly considering the rotation speed of the servo motor 12 when the brake signal is received. Accordingly, the motor control system according to the third embodiment can detect an abnormality of the mechanical brake 13 or an indication thereof, more accurately than the motor control system of the second embodiment.

In the above described third embodiment, the first storage unit 31, illustrated in FIG. 1, may be provided with a function for sequentially storing the quotient of ($V^2/L$) calculated by the displacement amount calculation unit every time a brake signal is received, namely every time the mechanical brake 13 is operated. If such a function is provided, the abnormality determining unit 30 can compare the quotient of ($V^2/L$) obtained by the displacement amount calculation unit 29 every time the brake signal is received and the quotient of ($V^2/L$) previously stored in the first storage unit 31. If the quotient of ($V^2/L$) obtained from the displacement amount calculation unit 29 decreases every time a brake signal is received, the abnormality determining unit 30 may determine that this is an indication of the reduction in effectiveness of the mechanical brake 13.

Other Embodiments

Further, the motor control system of each of the aforementioned embodiments detect the position of the servo motor 12 in the rotational direction, by a pulse coder such as an encoder, to obtain the falling amount (rotational displacement amount) of the main spindle head 17 after the operation of the mechanical brake 13. However, instead of using such an encoder, the falling amount (rotational displacement amount) of the main spindle head 17 after the operation of the mechanical brake 13 may be directly obtained by using a linear scale.

Further, the motor control system of the aforementioned three embodiments may be applied not only to a machine tool 11 as illustrated in FIG. 1 but also to an industrial robot or a motor driven press machine, etc. For example, if used in an industrial robot, the servo motor 12 is used to drive an axis of the robot and the position detector 19 is used to monitor the displacement of the axis of the robot.

Furthermore, the mechanical brake 13 is provided on the outside of the servo motor 12 as shown in FIG. 1. However the mechanical brake 13 may be built into the servo motor 12 such that they are integrated. Namely, it is only necessary for the mechanical brake 13 to brake the output axis of the servo motor 12 or a drive axis like the ball screw 18 connected to the output axis.

The above indicated embodiments are typical. However the present invention is not limited to such embodiments and the shape, configuration and materials may be changed within a range not deviating from the spirit of the present invention.

The Effects of the Aspects of the Invention

According to the first and seventh aspects of the present invention, by using the position detector, the history of the rotation position of the servo motor from when the signal is received to when the rotation of the servo motor stops, in response to receipt of the signal (e.g., a signal input along with a power off signal, emergency stop signal, or alarm signal, etc.) for operating the mechanical brake. By obtaining such a history, the rotational displacement amount of the servo motor from the start of operating the mechanical brake to when the rotation of the servo motor stops may be calculated. The larger the rotational displacement amount calculated as such, the larger the reduction in braking force of the mechanical brake. Accordingly, by determining whether or not the calculated rotational displacement amount exceeds the predetermined first threshold value, an abnormality of the mechanical brake or an indication thereof can be detected. Namely, according to the present invention, the reduction in braking force of the mechanical brake can be understood, for example, when a machine tool or a robot etc. finishes a job or during an emergency stop. Therefore, an abnormality of the mechanical brake or an indication thereof can be detected without the need to carry out a separate inspection of the mechanical brake. In other words, a motor control system which can realize a high level of preventative maintenance by the early detection of abnormalities of the mechanical brake or an indication thereof leading to the breakdown of the mechanical tool or the robot is provided.

In the second and eighth aspects, the rotation speed of the servo motor at the start of operating the mechanical brake is obtained, the first threshold value is changed according to the obtained rotation speed, and whether or not an abnormality exists in the mechanical brake is determined. Namely, an abnormality of the mechanical brake is determined with respect to the calculated rotational displacement amount, by considering the rotational speed of the servo motor at the time of the start of operating the mechanical brake. Therefore, an abnormality of the mechanical brake or an indication thereof can be detected more accurately.

According to the third and ninth aspects of the present invention, the square of the rotation speed of the servo motor at the start of operating the mechanical brake is divided by the calculated rotational displacement amount. The quotient thus obtained is proportional to the deceleration generated by operating the mechanical brake. Namely, as the quotient decreases, the deceleration decreases and thus there is a reduction in the effectiveness of the mechanical brake. Therefore, by determining whether or not the quotient exceeds a predetermined second threshold value, an abnormality of the mechanical brake or an indication thereof may be detected. Further, by determining an abnormality of the mechanical brake by using the aforementioned quotient, the reduction in effectiveness of the mechanical brake can be detected by strictly considering the rotation speed of the servo motor at the start of operating the mechanical brake.

According to the fourth and tenth aspects of the present invention, by determining whether or not the calculated rotation speed is increasing every time the mechanical brake is operated, an indication of the reduction in effectiveness of the mechanical brake can be detected.

According to the fifth and eleventh aspects of the present invention, by determining whether or not the quotient is decreasing every time the mechanical brake is operated, an indication of the reduction in effectiveness of the mechanical brake can be detected.

According to the sixth and twelfth aspects of the present invention, by being able to output the history of the rotational position of the servo motor from when the mechanical brake begins operating to when the rotation of the servo motor stops, such a history may be used outside the motor control system.

What is claimed is:

1. A motor control system comprising:
   a servo motor;
   a mechanical brake acting on the servo motor or an axis driven by the servo motor;
   a controller which controls the servo motor and the mechanical brake; and
   a position detector which detects the rotation position of the servo motor or the position of the axis, wherein the controller comprises:
      a signal receiving unit which receives a signal which operates the mechanical brake;
      a position monitoring unit which monitors the rotation position of the servo motor by the position detector, and obtains the history of the rotation positions of the servo motor from when the signal is received to when the servo motor stops rotating;
      a displacement amount calculation unit which calculates, from the history, the amount of rotational displacement of the servo motor from when the signal is received to when the servo motor stops rotating;
      an abnormality determining unit which determines that an abnormality exists in the mechanical brake when the calculated amount of rotational displacement exceeds a predetermined first threshold value,
      wherein the position monitoring unit obtains the rotational speed of the servo motor when the signal is received;
      the displacement amount calculation unit divides the square of the obtained rotational speed by the previously calculated amount of rotational displacement; and
      the abnormality determining unit determines that an abnormality exists in the mechanical brake when the quotient is smaller than a second predetermined threshold value.

2. The motor control system according to claim 1, wherein the controller further comprises a first storage unit which sequentially stores the quotient obtained from the displacement amount calculation unit every time a signal is received, wherein, the abnormality determining unit determines that an abnormality exists in the mechanical brake when the quotient obtained from the displacement amount calculation unit every time a signal is received, decreases more than the quotient previously stored in the first storage unit.

3. A motor control system, comprising:
   a servo motor;
   a mechanical brake acting on the servo motor or an axis driven by the servo motor;
   a controller which controls the servo motor and the mechanical brake; and
   a position detector which detects the rotation position of the servo motor or the position of the axis, wherein the controller comprises:
      a signal receiving unit which receives a signal which operates the mechanical brake;
      a position monitoring unit which monitors the rotation position of the servo motor by the position detector, and obtains the history of the rotation positions of the servo motor from when the signal is received to when the servo motor stops rotating;
      a displacement amount calculation unit which calculates, from the history, the amount of rotational displacement of the servo motor from when the signal is received to when the servo motor stops rotating; and
      an abnormality determining unit which determines that an abnormality exists in the mechanical brake when the calculated amount of rotational displacement exceeds a predetermined first threshold value,
   wherein the controller further comprises a first storage unit which sequentially stores the amount of rotational displacement calculated by the displacement amount calculation unit every time a signal is received, wherein, the abnormality determining unit determines that an abnormality exists in the mechanical brake when the amount of rotational displacement calculated by the displacement amount calculation unit every time a signal is received, increases more than the amount of rotational displacement previously stored in the first storage unit.

4. A brake abnormality detection method for a motor control system comprising: a servo motor, a mechanical brake acting on the servo motor or an axis driven by the servo motor, and a position detector which detects the rotation position of the servo motor or the position of the axis, the brake abnormality detection method comprising:
   obtaining the history of the rotation positions of the servo motor from the start of the operation of the mechanical brake until the rotation of the servo motor stops;
   calculating, from the aforementioned history, the amount of rotational displacement of the servo motor from the start of the operation of the mechanical brake until the rotation of the servo motor stops; and
   determining that an abnormality exists in the mechanical brake when the calculated amount of rotational displacement exceeds a first threshold value,
   the brake abnormality detection method, further comprising:
      obtaining the rotation speed of the servo motor at the start of the operation of the mechanical brake;
      dividing the square of the obtained rotation speed by the previously calculated amount of rotational displacement; and
      judging that an abnormality exists in the mechanical brake when the quotient is lower than a predetermined second threshold value.

5. The brake abnormality detection method according to claim 4, further comprising, judging that an abnormality exists in the mechanical brake when the quotient decreases every time the mechanical brake is operated.

6. A brake abnormality detection method for a motor control system comprising a servo motor, a mechanical brake acting on the servo motor or an axis driven by the servo motor, and a position detector which detects the rotation position of the servo motor or the position of the axis, the brake abnormality detection method, comprising:
   obtaining the history of the rotation positions of the servo motor from the start of the operation of the mechanical brake until the rotation of the servo motor stops;
   calculating, from the aforementioned history, the amount of rotational displacement of the servo motor from the start of the operation of the mechanical brake until the rotation of the servo motor stops; and
   determining that an abnormality exists in the mechanical brake when the calculated amount of rotational displacement exceeds a first threshold value, the brake abnormality detection method, further comprising:

judging that an abnormality exists in the mechanical brake when the calculated amount of rotational displacement increases every time the mechanical brake is operated.

* * * * *